July 15, 1947.  A. RUETSCHI  2,423,904

MACHINE TOOL

Filed Dec. 28, 1945  3 Sheets-Sheet 1

INVENTOR.
ARNOLD RUETSCHI
BY
Kwis, Hudson, Boughton & Williams
ATTORNEYS

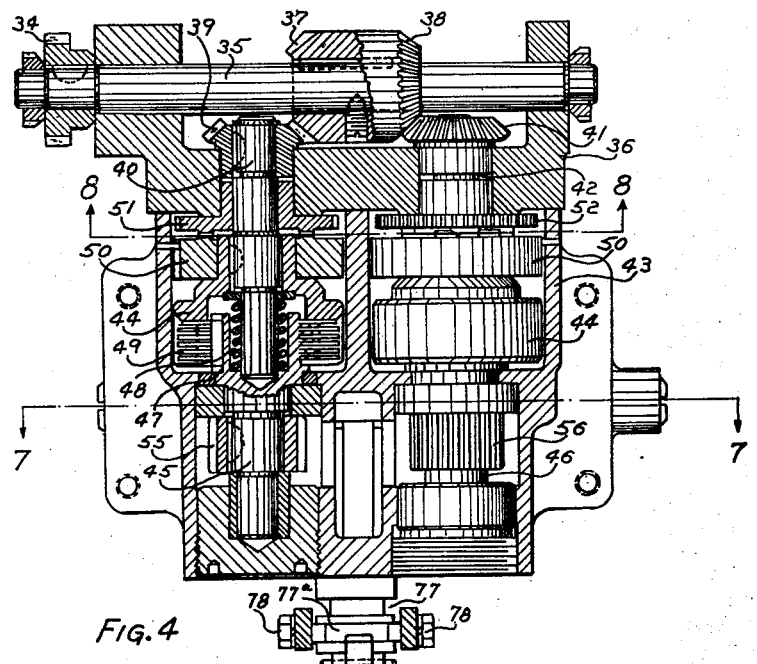

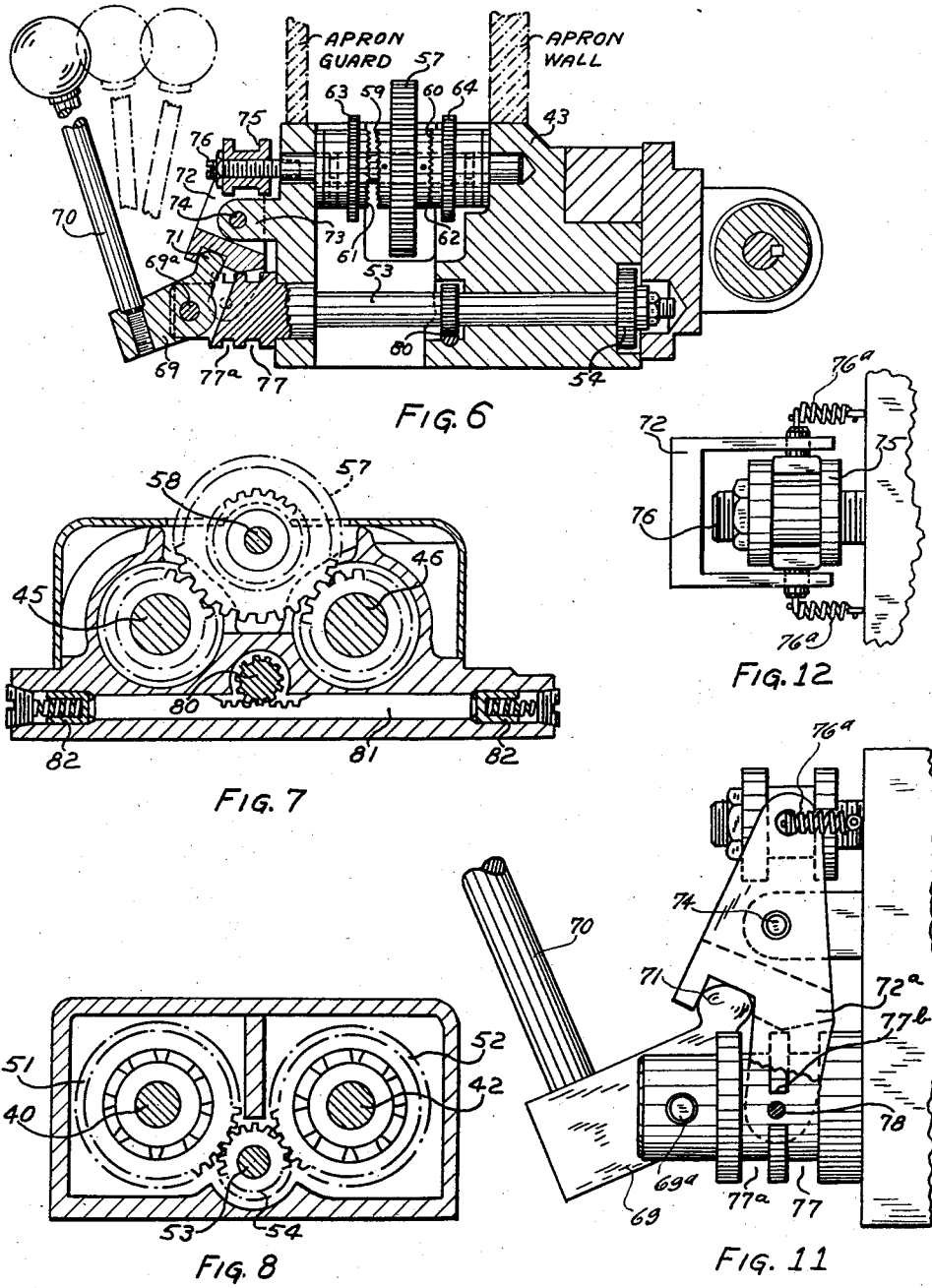

Patented July 15, 1947

2,423,904

UNITED STATES PATENT OFFICE 2,423,904

MACHINE TOOL

Arnold Ruetschi, Cleveland, Ohio, assignor to The Warner & Swasey Company, Cleveland, Ohio, a corporation of Ohio Application December 28, 1945, Serial No. 637,681

8 Claims. (Cl. 82—22)

This invention relates to a machine tool and particularly to means for imparting rapid traverse movements in both directions to the slides of a machine tool as, for instance, the cross slide carriage and cross slide.

An object of the invention is to provide a novel and improved mechanism for imparting selectively rapid traverse movements in both directions to a pair of slides of a machine tool as, for example, to the cross slide carriage and cross slide.

Another object is to provde a mechanism such as referred to in the last named object and which mechanism is driven from the same power source that drives the machine tool.

A more specific object is to provide a unit supported by the cross slide carriage of a machine tool and acting to impart rapid traverse movements in both directions selectively to the cross slide carriage or to the cross slide and which unit is compact and novel in its combination of parts and is controlled by a single control member located within convenient reach of the operator from the position he occupies in operating the machine tool.

Another object is to increase the efficiency of operation of a machine tool by providing for power driven rapid traverse movements of the cross slide carriage and cross slide as referred to in the previously mentioned objects and wherein such movements can be readily and selectively controlled by the operator.

Further and additional objects and advantages not hereinbefore enumerated will become apparent during the detailed description of an embodiment of the invention which is to follow.

Referring to the accompanying drawings illustrating said embodiment of the invention, Fig. 1 is a front elevational view of a machine tool wherein the mechanism embodying the invention is in the form of a unit incorporated in the apron of the cross slide carriage.

Fig. 4 is a sectional view taken substantially on line 4—4 of Fig. 5 looking in the direction of the arrows.

Fig. 5 is a detached front elevational view of the unit embodying the invention and is on a larger scale than said unit as shown in Fig. 2 where it is applied to the apron.

Fig. 6 is a sectional view taken substantially on line 6—6 of Fig. 5 looking in the direction of the arrows.

Figs. 7 and 8 are sectional views taken respectively on lines 7—7 and 8—8 of Fig. 4 looking in the direction of the arrows.

Fig. 9 is a diagrammatic illustration of the positions assumed by the control lever in controlling the unit.

Figs. 10 and 10a are detached fragmentary elevational views of a portion of the friction clutch actuating rings shown in Fig. 4 and the gears associated therewith.

Fig. 11 is a fragmentary partial side elevational view on a larger scale of the control lever and the parts to which it is attached, and Fig. 12 is a top plan of Fig. 11.

Although the unit embodying the invention is shown as applied to the apron of a cross slide carriage for imparting rapid traverse movements in opposite directions to the cross slide carriage and the cross slide of a lathe, it will be understood that it may be utilized in other types of machine tools for imparting rapid traverse movements in opposite directions to a pair of slides or to compounded slides.

Figure 1:
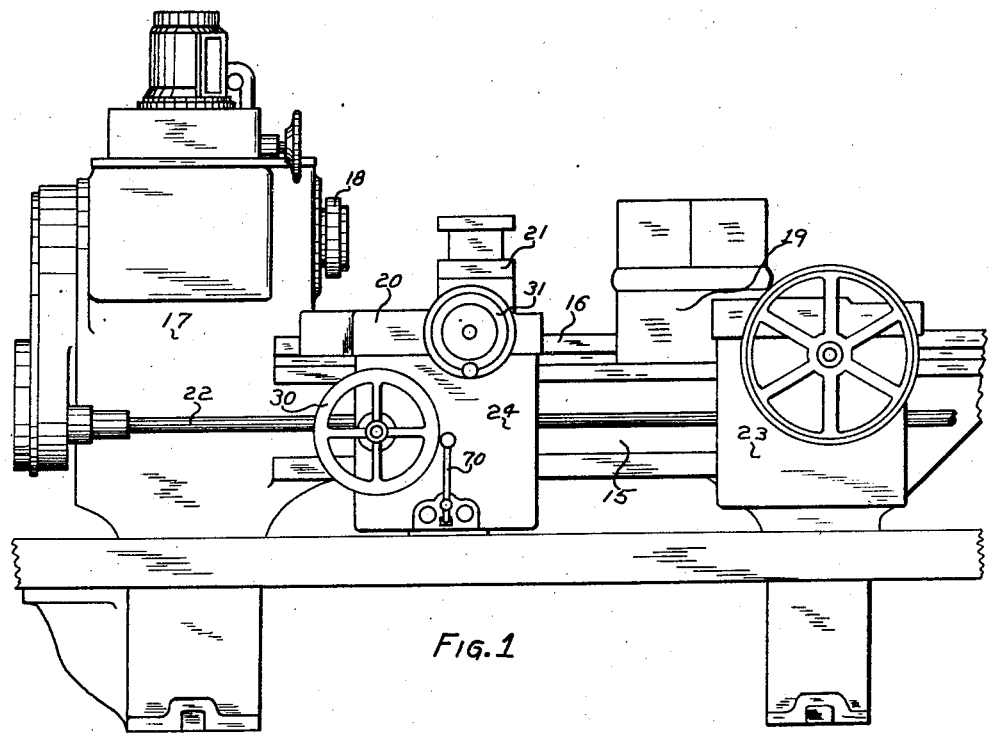
Figures 2, 3:
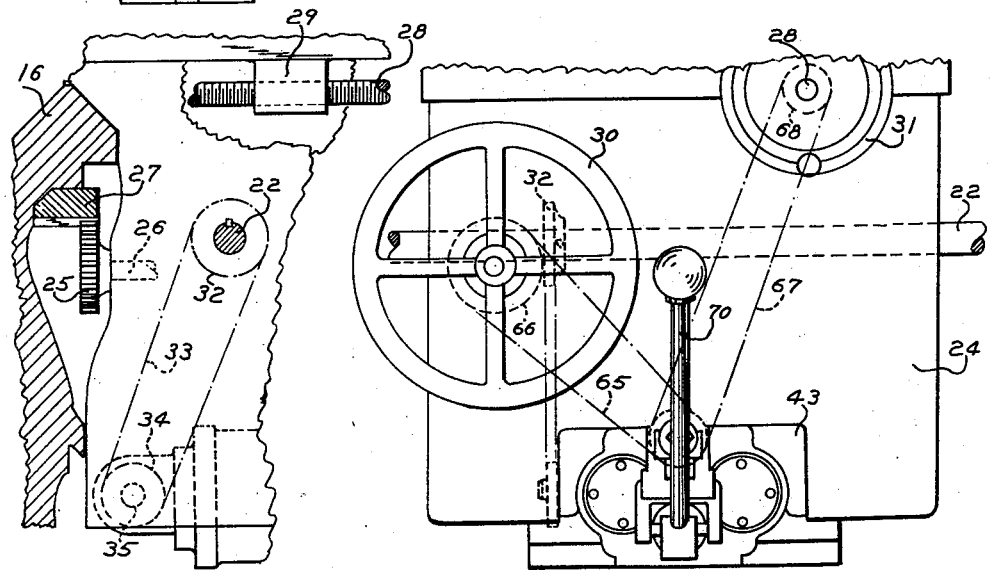
Fig. 2 is a fragmentary front elevational view of the apron of the cross slide carriage on a larger scale than Fig. 1.
Fig. 3 is a fragmentary end elevational view of the apron looking from the left hand side of Fig. 2 with a portion of the bed and apron shown in section.

The lathe shown in Fig. 1 comprises a bed 15 provided with ways 16 extending longitudinally of the bed toward the headstock 17 and parallel to each other and to the spindle 18 rotatably mounted in the headstock. A turret slide 19 is movable on the ways 16 toward and away from the spindle as is also a cross slide carriage 20 which mounts a cross slide 21 for movement transversely of the ways. A feed shaft 22 driven from the spindle 18 extends longitudinally of the front side of the bed 15 and passes through the aprons 23 and 24 of the turret slide 19 and the cross slide carriage 20. The structure thus far described is well known in machine tools and need not be explained in greater detail.

The cross slide carriage 20 is moved longitudinally of the bed by means of a pinion 25 mounted on a shaft 26 rotatably supported in the apron, with said pinion meshing with a rack 27 carried by the bed below the front way 16. The cross slide 21 is moved on the carriage transversely of the ways by a screw 28 rotatably mounted in the carriage 20 and extending through a nut member 29 rigidly secured to the cross slide. The shaft 26 and the screw 28 are driven from the feed shaft 22 by suitable transmissions carried by the apron 24 for imparting feeding movements to the carriage and to the cross slide. The transmissions just referred to are well known in the art and are clearly illustrated in Figs. 4 and 5 of Van Hamersveld Patent 2,169,748, August 15, 1939, and, therefore, as they form no part of the invention they need not be described in detail herein. It should suffice to state that said transmissions include clutch elements which can be controlled to selectively cause the cross slide carriage or the cross slide or both to be moved by the feed shaft through said transmissions with a feeding movement. It will also be understood that in the usual construction the carriage and the cross slide are manually moved toward and away from the work by means of the hand wheels 30 and 31 mounted at the front of the apron and operatively connected to the shaft 26 and screw 28.

The manual movements of the carriage and cross slide as just referred to, and especially when long or large diameter work pieces are being machined, consume considerable time as well as the energy and attention of the operator and thus decrease the efficiency of operation of the machine. The present invention contemplates a power driven unit which can be incorporated into the apron of the carriage and operatively connected to the shaft 26 and the screw 28 for imparting rapid traverse movements to the carriage and cross slide in both directions, thus avoiding the necessity of the operator manually moving the carriage and cross slide toward and away from cutting position and thereby increasing the efficiency of operation of the machine.

The unit is power driven and in this instance is shown for simplicity as deriving its power from the shaft 22 which drives the transmissions in the apron above referred to. It will be understood that the unit may be driven from an independent power source and at a constant speed. The unit also is controlled in a convenient and efficient manner by means of a single control member located on the front of the apron where it is accessible to the operator.

A sprocket 32 is carried by the apron and is splined on the shaft 22 for movement axially thereof and for rotation therewith. A chain 33 is driven by said sprocket 32 and extends around and drives a sprocket 34 fixed on the end of a shaft 35 that is rotatably mounted in suitable bearings formed in the support 36 forming part of the unit and movable with the apron. The shaft 35 has fixed thereto a double bevel gear composed of the bevel gear 37 and the bevel gear 38. The bevel gear 37 meshes with a bevel gear 39 fixed on shaft 40 rotatably supported in the support 36 and the bevel gear 38 meshes with a bevel gear 41 fixed on a shaft 42 likewise mounted in the support and extending parallel to the shaft 40 toward the front of the unit.

The shafts 40 and 42 extend into the housing 43 of the unit and each shaft has splined to it within the housing the hub of a clutch member 44. The forward ends of the shafts 40 and 42 are reduced and extend into cup-shaped portions formed on the inner ends of shafts 45 that extend forwardly in the housing 43 in axial alignment with the shafts 45 and 46 and are rotatably supported in suitable bearings carried by the housing 43. The inner ends of the shafts 45 and 46 are shaped to provide clutch members 47 which cooperate with the clutch members 44 previously referred to. The said clutch members 44 and 47 carry cooperating friction clutch plates as will be well understood and said plates are normally maintained out of friction driving relationship by coil springs 48 surrounding the reduced forward ends of the shafts 40 and 42 and bearing against the bottom of the cup-shaped inner ends of the shafts 45 and 46 and against disks 49 slidable on the reduced forward ends of the shafts 40 and 42 and contacting the clutch members 44. However, since the clutch members 44 are splined on the shafts 40 and 42 it will be understood that movement of said members axially of said shafts toward the front of the unit and against the action of the springs 48 causes the clutch plates to engage in friction driving contact to effect driving rotation of the shafts 45 and 46 from the shafts 40 and 42. The hubs of the clutch members 44 rotate within non-rotatable clutch actuating rings 50 which are provided on their rear faces with camming surfaces that cooperate with camming projections or teeth on the front faces of gears 51 and 52 that are freely rockable on the shafts 40 and 42, respectively, intermediate the gears 39 and 41 and the clutch actuating rings 50.

A shaft 53 is rockably mounted in the housing intermediate and below the shafts 40, 42, 45 and 46 and extends parallel thereto with its front end projecting outwardly of the unit and adapted to have secured thereto a control member later to be referred to. The shaft 53 adjacent its rear end has fixed thereto a gear 54 which meshes with the gears 51 and 52, wherefore it will be seen that rocking of the shaft 53 in one or the other direction causes clockwise or anticlockwise rocking of the gears 51 and 52.

When the gears 51 and 52 are rocked simultaneously in a clockwise direction the teeth on the gear 51 engage the camming surfaces on its cooperating clutch actuating member 50 to move said member axially and to engage the clutch to interconnect the shafts 40 and 45, it being understood that the clockwise rocking of the gear 52 is an idle movement thereof with respect to its cooperating clutch actuating member 50, see Figs. 10 and 10a. It will be noted that when the gears 51 and 52 are rocked simultaneously in an anticlockwise direction the teeth on the gear 52 will engage the camming surfaces on its cooperating clutch actuating member 50 to move said member axially to engage the clutch and interconnect the shafts 42 and 46 while the teeth on the gear 51 will have idle movement with respect to its cooperating clutch actuating member 50, see Figs. 10 and 10a. When the shaft 53 is in a neutral position wherein both friction clutches are disengaged the teeth on the gears 51 and 52 will be slightly spaced from the camming surfaces on their cooperating clutch actuating members 50, as indicated in Figs. 10 and 10a.

From the foregoing it will be seen that the rocking of the shaft 53 in an anticlockwise direction effects engagement of the friction clutch to interconnect the shafts 40 and 45 while rocking of the shaft 53 in a clockwise direction effects engagement of the friction clutch to interconnect the shaft 42 and 46.

The shafts 45 and 46 have fixed thereto, respectively, gears 55 and 56 which mesh with a gear 57 fixed to a shaft 58 that is rotatably supported in the housing above the shaft 53 and at a higher level than the shafts 45 and 46. The opposite ends of the hub of the gear 57 are provided, respectively, with serrated clutch teeth 59 and 60 adapted to be engaged, respectively, with serrated clutch teeth 61 and 62 formed on the ends of the hubs of sprockets 63 and 64 which are freely rotatable on the shaft 58 but are held against axial movement by any suitable well known means. The shaft 58 is capable of axial shifting movement to engage the clutch teeth 59 of the gear 57 with the teeth 61 of the sprocket 63 or the clutch teeth 60 of the gear 57 with the teeth 62 of the sprocket 64 to thus cause rotation of one or the other of the sprockets. The sprocket 63 is operatively connected by a chain 65 with a sprocket 66 fixed to the shaft 26, while the sprocket 64 is operatively connected by a chain 67 with a sprocket 68 fixed on the screw 28. Although sprockets and chains are shown herein, it is merely for illustrative purposes, and it will be understood that various other forms of operative connections may be used. It will thus be seen that the shaft 26 can be driven from the gear 57 through the sprocket 63 or the screw 28 can be driven from said gear 57 through the sprocket 64 depending upon the position of the gear 57.

The shaft 53 previously referred to projects outwardly through the front wall of the housing 43 of the unit and is provided at its end with a forked portion in which a lever 69 is mounted to rock in a substantially vertical plane about a horizontal axis. The lever 69 has secured to its forward end a control rod 70 by which the operator can rock the shaft 53 on its axis by moving the rod in one or the other of two planes substantially parallel to the plane of the front of the apron, or the operator can rock the lever 69 about its axis by moving the rod 70 in a plane transverse to the plane of the front of the apron and said two planes above mentioned. The inner end of the lever 69 is provided with a spherical portion 71 which extends into a slot formed in the base of a fork member 72 which straddles and is pivotally mounted on a supporting arm 73 extending outwardly from the front of the housing of the unit by means of a pin 74 extending through said arm and through the legs of the fork member 72. The legs of the fork member 72 also straddle a spool 75 (see Figs. 6 and 11) and have shoes which engage in the annular groove in the periphery of said spool. The spool 75 is operatively connected by means of a bolt or other suitable connecting element 76 with the axial shiftable shaft 58 that has the gear 57 keyed thereto. Therefore it will be seen that rocking of the control rod 70 toward and away from the front of the apron rocks the lever 69 on its axis 69a and in turn rocks the fork member 72 about the axis 74 to axially shift the shaft 58 to engage the clutch teeth 59 with the clutch teeth 61 or the clutch teeth 60 with the clutch teeth 62 as the case may be. The springs 76a connected to the housing and to the fork member 72 act to rock the member and the lever 69 to normally shift the shaft 58 to a position wherein both sprockets 63 and 64 are declutched from the shaft. When the fork member is rocked toward the housing the springs 76a are compressed and when it is rocked away from the housing said springs are extended. The shaft 53 inwardly of its forked outer end is provided with circumferential parallel grooves 77 and 77a interconnected at diametrically opposite points by short axially extending slots 77b (see Fig. 11). The fork 72 is provided with downwardly extending legs 72a which straddle the outer end of the shaft 53 and carry screw pins 78 which extend into the groove 77 or the groove 77a, depending upon the rocked position of the lever 69 about its axis 69a. It will be noted that when the shaft 53 is in the position wherein both friction clutches are disengaged the pins 78 can pass from one groove to the other through the slots 77b during the inward or outward rocking of the lever 69.

The shaft 53 is provided intermediate its ends with a pinion 80 which meshes with a rack portion formed on a rod 81 that is slidably mounted in the housing and has its opposite ends engaging spring pressed plungers 82, see Fig. 7, wherefore whenever the operator releases the control member 70 while in the dash line positions of Fig. 5 said shaft 53 will be rocked by the spring pressed movement of the rod 81 to move the control rod or member 70 to the full line or neutral position, at which time both friction clutches are disengaged. Also at this time the springs 76a rock the fork member 72 to position the pins 78 in the slots 77b at the full line normal position N, at which time both sprockets 63 and 64 are declutched from shaft 58 and both friction clutches are disengaged.

Assuming that the carriage and cross slide are in withdrawn position relative to the work while the work spindle 18 and shaft 22 are rotating and the operator wishes to move the carriage rapidly forward to cutting position, he rocks the control rod 70 in the plane that is transverse to the front of the apron from normal position N of Fig. 9 wherein all the friction and positive clutches are disengaged to the full line position of Figs. 5 and 6 and position A of Fig. 9. He then rocks the rod in one of the two planes which are substantially parallel to the front of the apron toward the left as viewed in the drawing from position A to position B of Fig. 9. The rocking movement of the control member from normal position N to neutral position A clutches sprocket 64 to shaft 58 and the rocking movement toward the left from position A to position B rocks the gear 51 to effect engagement of the friction clutch carried by the shafts 40 and 45 to cause the gear 55 to drive the gear 57 and thus to drive through the engaged clutch teeth 60 and 62 sprocket 64 and chain 65. Therefore at this time the shaft 26 will be driven at a rapid speed from the shaft 22 through the unit and in the forward direction to cause rapid forward movement to be imparted to the carriage. When the carriage reaches cutting position the operator releases the control member 70 and said member is returned by the spring pressed rod 81 from position B to positon A of Fig. 9, thus disengaging the friction clutch on the shafts 40 and 45 and interrupting the drive to the gear 57 and by springs 76a from neutral position A to normal position N to declutch both sprockets from shaft 58.

Assuming that the carriage has completed its feeding movement, the operator moves the control member 70 from normal position N wherein all the friction and positive clutches are disengaged to position A of Fig. 9 and thence to position C, whereupon the gear 52 is rocked to cause the friction clutch on the shafts 42 and 46 to be engaged so that gear 56 now drives the gear 57 and the sprocket 64 will be driven in the reverse direction, thus causing reverse rapid drive to be imparted to the shaft 26 through said sprocket, chain 65 and sprocket 66. As soon as the carriage has been withdrawn from the work by means of the rapid return movement the operator releases the control member 70 and said member returns automatically from position C to position A and then to normal position N of Fig. 9.

Now assuming that the carriage is positioned and the cross slide 21 is to be moved rapidly forward to cutting position, the operator rocks the control member 70 inwardly from position N to positon D of Fig. 9 and this movement of the control member interengages the clutch teeth 59 and 61. The operator then rocks the control member 70 toward the left from position D to position E of Fig. 9 to engage the friction clutch on the shafts 40 and 45 to cause the gear 55 to drive the sprocket 63 in the forward direction through the gear 57. The sprocket 63 then drives the chain 67 and the screw 28 is rotated through the sprocket 68 in the proper direction to cause the cross slide 21 to move in the forward direction at a rapid speed toward cutting position. When the cross slide reaches cutting position the operator releases the control member 70 and said member automatically returns to normal position N and the friction clutch on shafts 40 and 45 is disengaged thus interrupting the drive to gear 57 and sprocket 63. Also at this time both sprockets are declutched from shaft 58. At the end of the forward feeding movement of the cross slide the operator moves the control member 70 from position N to position D to effect interengagement of clutch teeth 59 and 61 and then toward the right to position F of Fig. 9 and this movement causes the friction clutch on shafts 42 and 46 to be engaged with the result that gear 56 drives the gear 57 and sprocket 63 in the reverse direction and screw 28 is driven through the chain 67 and sprocket 68 at the rapid speed in the reverse direction and the cross slide is returned to its starting position with a rapid return movement. As soon as the return of the cross slide is completed the operator releases the control member 70 and said member automatically returns from position F to normal position N, with the result that the friction clutch on shafts 42 and 46 is disengaged and the drive to sprocket 63 is interrupted while both sprockets are declutched from shaft 58.

When the pins 78 are in groove 77a rapid movement can be imparted only to the carriage while when said pins are in groove 77 rapid movement can be given only to the cross slide. Since the pins 78 register with the slots 77b only when the control member 70 is in neutral position wherein both friction clutches are disengaged it will be seen that it is impossible to impart rapid movement simultaneously to both the carriage and cross slide.

In the claims appended hereto the shaft 35 is called the power shaft, the shafts 40 and 42 the drive shafts, the shafts 45 and 46 the driven shafts, the shaft 58 the output shaft, the sprockets 63 and 64 the driven members and the shaft 53 the control shaft.

Although a preferred embodiment of the invention has been illustrated and described herein, it will be understood that the invention is susceptible of various modifications and adaptations within the scope of the appended claims.

Having thus described my invention, I claim:

1. In a machine tool having a slide, a rapid traverse mechanism carried by said slide and comprising a power shaft, a pair of parallel drive shafts each having a gear freely rockable thereon, means connecting said drive shafts with said power shaft for rotation of the former in opposite directions to each other, a pair of driven shafts each axially aligned with a respective drive shaft and each having fixed thereto an elongated gear, a friction clutch for operatively connecting each pair of aligned drive and driven shafts, an output shaft having a gear fixed thereto and meshing with both of said elongated gears and adapted to be operatively connected with said slide for imparting rapid traverse movement thereto, a rockable control shaft provided with a pinion meshing with both of said drive shaft gears, a non-rotatable friction clutch actuating means on each of said drive shafts adjacent to said gear thereon, said drive shaft gears and said clutch actuating means being provided with cooperating camming portions so arranged that the simultaneous rocking of the gears in one direction by said control shaft from a neutral position effects engagement of one of said clutches and the simultaneous rocking thereof from neutral position in the other direction effects engagement of the other clutch.

2. A machine tool as defined in claim 1 and wherein a manually actuated control member is operatively connected with said control shaft for rocking the same, while means is operatively associated with said shaft for rocking the same automatically to neutral position wherein both clutches are disengaged after said shaft has been rocked to a clutch engaged position.

3. In a machine tool having a slidable carriage on which a slide is mounted, a rapid traverse mechanism mounted by said carriage for imparting rapid traverse movement thereto and to said slide and comprising a power shaft, a pair of parallel drive shafts, means connecting said drive shafts with said power shafts for rotating of the former in opposite directions to each other, a pair of driven shafts each axially aligned with a respective drive shaft and each having fixed thereto an elongated gear, a friction clutch for operatively connecting each pair of aligned drive and driven shafts, an output shaft having a gear fixed thereto and meshing with both of said elongated gears, said output shaft being endwise slidable and having fixed thereto axially spaced positive clutch elements, driven members freely rotatable on said output shaft and provided with clutch portions adapted to be clutched selectively to said elements whereby one or the other of said driven members can be clutched to said output shaft by sliding movement thereof, said driven members being adapted to be operatively connected respectively with said carriage and slide for moving the same, a control member operatively connected to said friction clutches and movable in either one of two planes to effect selectively engagement of one or the other of said friction clutches to cause rotation of said output shaft in opposite directions or to effect disengagement of both of said friction clutches, operative connections between said control member and said output shaft and effective upon movement of said control member in a third plane to slide said shaft into clutched relationship to one or the other of said driven members, and means operatively associated with said control member for moving the same automatically to a position wherein both friction clutches are disengaged.

4. A machine tool as defined in claim 3 and including a gear freely rockable on each of said drive shafts, a rockable control shaft having a pinion meshing with both of said drive shaft gears, and a non-rotatable friction clutch actuating means mounted on each of said drive shafts adjacent to said gear thereon, said drive shaft gears and said clutch actuating means being provided with cooperating camming portions so arranged that the simultaneous rocking of the gears in one direction from a neutral position by said control shaft effects engagement of one of said clutches and the simultaneous rocking thereof in the other direction from neutral position effects engagement of the other clutch, said control member being operatively connected with said control shaft to rock the latter during the movement of said control member in either of said two planes.

5. A machine tool as defined in claim 3 and including means allowing movement of said control member in said third plane to clutch said output shaft and said driven members together only when said control member is in a position wherein both friction clutches are disengaged.

6. In a machine tool having a movable carriage which carries a slide, a rapid traverse mechanism supported by said carriage for moving said carriage and slide selectively at a rapid rate and comprising a power shaft, a pair of parallel drive shafts each having a gear freely rockable thereon, means connecting said drive shafts with said power shaft for rotation of the former in opposite directions to each other, a pair of driven shafts each axially aligned with a respective drive shaft and each having fixed thereto an elongated gear, a friction clutch for operatively connecting each pair of aligned drive and driven shafts, an output shaft having a gear fixed thereto and meshing with both of said elongated gears, said output shaft being endwise slidable and provided with axially spaced positive clutch elements fixed thereto, driven members freely rotatable on said output shaft and provided with clutch portions adapted to be clutched selectively to said clutch elements upon sliding movement of said output shaft, said driven members being adapted to be operatively connected respectively with said carriage and said slide for moving the same, a rockable control shaft provided with a pinion meshing with both of said drive shaft gears, a non-rotatable friction clutch actuating means on each of said drive shafts adjacent to said gear thereon, said drive shaft gears and said clutch actuating means being provided with cooperating camming portions so arranged that the simultaneous rocking of the gears in one direction by said control shaft from a neutral position effects engagement of one of said clutches and the simultaneous rocking thereof in the other direction from neutral position effects engagement of the other clutch, said control shaft being provided adjacent its end with a pair of circular grooves interconnected at diametrically opposite points with slots and outwardly of said grooves with a forked portion, a control member pivotally mounted in said forked portion to rock about an axis transverse to the axis of said control shaft, a rockable element operatively connected with said control member and said output shaft and mounted on an axis located above and extending transversely to said control shaft, said element being provided with depending portions carrying pins projecting into one or the other of said grooves depending upon the shifted position of said output shaft, said pins aligning with said slots only when both of said friction clutches are disengaged.

7. A compact rapid traverse unit for a carriage and cross slide of a machine tool comprising a housing support adapted to be secured unitarily to the carriage, a power shaft rotatably mounted in said support, a pair of parallel drive shafts mounted in said support, means connecting said drive shafts with said power shaft for rotation of the former in opposite directions to each other, a pair of driven shafts rotatably mounted in said support and each axially aligned with a respective drive shaft and having fixed thereto an elongated gear, a friction clutch for operatively connecting each pair of said axially aligned drive and driven shafts, an endwise slidable output shaft rotatably mounted in said support and having a gear fixed thereto and meshing with both of said elongated gears, axially spaced positive clutch elements fixed to said output shaft, driven members freely rotatable on said output shaft and provided with clutch portions adapted to be clutched selectively to said clutch elements whereby one or the other of said driven members can be clutched to said output shaft by sliding movement thereof, said driven members being adapted to be operatively connected respectively to the mechanisms for moving the carriage and cross slide, a control member operatively connected to said friction clutches and movable in either one of two planes to effect selectively engagement of one or the other of said friction clutches to cause rotation of said output shaft in opposite directions or to effect disengagement of both of said friction clutches, operative connections between said control member and said output shaft and effective upon movement of said control member in a third plane to slide said shaft into clutched relationship to one or the other of said driven members, and means operatively associated with said control member for normally maintaining the same in a position wherein both friction clutches are disengaged.

8. A machine tool as defined in claim 3 and wherein means is operatively associated with said control member for moving the same automatically to a position to shift said output shaft to a position wherein both driven members are declutched from said output shaft.

ARNOLD RUETSCHI.

REFERENCES CITED

The following references are of record in the file of this patent:

UNITED STATES PATENTS

| Number | Name | Date |
|---|---|---|
| 2,305,792 | Mobius | Dec. 22, 1942 |
| 2,354,266 | Kemper | July 25, 1944 |
| 2,405,435 | Kylin | Aug. 6, 1946 |